United States Patent
Kurokami

[19]

[11] Patent Number: 6,144,648
[45] Date of Patent: Nov. 7, 2000

[54] COMMUNICATION SYSTEM FOR MAKING CARRIER SYNCHRONOUS

[75] Inventor: Yuzo Kurokami, Tokyo, Japan

[73] Assignee: NEC Corporation, Tokyo, Japan

[21] Appl. No.: 08/956,908

[22] Filed: Oct. 23, 1997

[30] Foreign Application Priority Data

Oct. 23, 1996 [JP] Japan .................................. 8-279776

[51] Int. Cl.⁷ .................................................. H04Q 7/00
[52] U.S. Cl. .......................... 370/332; 370/252; 455/63; 455/69
[58] Field of Search .................................. 370/328, 329, 370/330, 332, 340, 343, 344, 252; 375/286, 288, 312; 455/63, 69, 501, 522, 561

[56] References Cited

U.S. PATENT DOCUMENTS

| | | | |
|---|---|---|---|
| 4,495,648 | 1/1985 | Giger | 455/73 |
| 4,777,653 | 10/1988 | Bonnerot et al. | 455/69 |
| 5,210,771 | 5/1993 | Schaeffer et al. | 375/1 |
| 5,450,617 | 9/1995 | Moore | 455/71 |
| 5,491,637 | 2/1996 | Haartsen | 455/62 |
| 5,539,728 | 7/1996 | Gaiani et al. | 370/18 |
| 5,713,074 | 1/1998 | Hulbert | 455/69 |
| 5,774,808 | 6/1998 | Sarkioja et al. | 455/436 |
| 5,806,003 | 9/1998 | Jolma et al. | 455/522 |
| 5,812,938 | 9/1998 | Gilhousen et al. | 455/69 |
| 5,815,818 | 9/1998 | Tanaka et al. | 455/522 |
| 5,839,056 | 11/1998 | Hakkinen | 455/69 |
| 5,870,393 | 2/1999 | Yano et al. | 370/335 |
| 5,893,035 | 4/1999 | Chen | 455/522 |
| 5,933,415 | 8/1999 | Huloux | 370/252 |

FOREIGN PATENT DOCUMENTS

| | | |
|---|---|---|
| 59-4350 | 1/1984 | Japan . |
| 60-84030 | 5/1985 | Japan . |
| 2-280423 | 11/1990 | Japan . |
| 4-352529 | 12/1992 | Japan . |

*Primary Examiner*—Huy D. Vu
*Assistant Examiner*—Dung Trinh
*Attorney, Agent, or Firm*—Young & Thompson

[57] ABSTRACT

In a communication system having a base station (1) and terminal stations (5-1 to 5-M) in two-way communication, frequency converters (12-1 to 12-N) transmit transmitting signals. The terminal stations transmit channel selection signals to the base station. A level controller 15 discriminates, in response to the channel selection signals from the terminal stations, each of the channels that is selected by the terminal stations and produces and supplies a level control signal to the respective frequency converters. The selected frequency converter increases a level of the transmitting signal that corresponds to the channel which is selected by a terminal station.

11 Claims, 5 Drawing Sheets

COMMUNICATION SYSTEM FOR MAKING CARRIER SYNCHRONOUS

BACKGROUND OF THE INVENTION

This invention relates to a communication system, and more particularly, to a communication system which comprises a base station and a plurality of terminal stations for two-way communication.

DESCRIPTION OF THE RELATED ART

As the communication system, a cellular radio telephone system and a cable television (CATV) system are known. In the conventional communication system, the base station multiplexes datum signals to produce and transmit multiplexed datum signals. The terminal stations are supplied with the multiplexed datum signals. Each of the terminal stations selects one of the multiplexed datum signals. Also, each of the terminal stations transmits a control signal to the base station.

In the conventional communication system, multi-level QMA modulation signals are used. The demodulator which uses the multi-level QMA modulation signal comprises a synchronous detection system which has a PLL circuit that reproduces a carrier from a receiving signal. Generally, the demodulator has the following noise characteristic.

A lock-out point and a pull-in point are different. The lock-out point is defined as a point at which a reproduction carrier becomes asynchronous when a noise gradually increases from a state of no noise. The pull-in point is defined as a point at which a reproduction carrier becomes synchronous when a noise gradually decreases from a state that the reproduction carrier is asynchronous because the noise is greater. Namely, carrier noise ratio (C/N value) of the pull-in point that is required is higher than that of the lock-out point. The carrier noise ratio (C/N value) has hysteresis. In case that the demodulator further has an error correction facility and a waveform equalization facility, the hysteresis becomes greater.

Therefore, in case of designing the communication system, it is needed to be in due consideration of C/N value of the pull-in point and it is not needed to be in due consideration of C/N value of the lock-out point. Namely, C/N value of the pull-in point which is required is satisfied in the whole communication system. Therefore, higher level diagram and noise characteristic are required in the whole communication system.

SUMMARY OF THE INVENTION

It is therefore an object of this invention to provide a communication system which is capable of normally making a carrier synchronous even when C/N value of a terminal station is wrong.

Other objects of this invention will become clear as the description proceeds.

According to a first aspect of this invention, there is provided a communication system in which two-way communications are implemented between a base station and a plurality of terminal stations in such a way that the plurality of terminal stations transmit channel selection signals each of which selects one of the channels, to the base station reciprocally, the base station comprising, a transmitting means which modulates data of a plurality of channels respectively to convert them into frequency corresponding to respective channels, thus transmitting the frequency, and a transmission level control means for controlling each transmission level of the channel in answer to a channel selection information denoting a selection channel while detecting the channel selection information which is transmitted from each of the terminal stations.

According to a second aspect of this invention, there is provided a communication system, wherein the transmitting means further comprises, a plurality of modulators which are provided corresponding to the channels, for modulating data of corresponding channels, a plurality of frequency converters which are provided corresponding to the plurality of modulators, for converting output of corresponding modulators into frequency corresponding to the channels, and a multiplexor which implements frequency multiplexing to each output of the plurality of frequency converters to transmit, wherein the transmission level control means controls respective output levels of the plurality of frequency converters.

According to a third aspect of this invention, there is provided a communication system, wherein the transmission level control means further comprises, a detection means for detecting each change of condition of selection information of the channel, and a means for controlling output level of the plurality of frequency converters corresponding to the channels whose change of condition is detected.

According to a fourth aspect of this invention, there is provided a communication system, wherein the detection means detects change of the number of the channels which is selected respectively, and means for controlling output level implements control of output level of the channels during fixed time period from the time when the number is changed.

According to a fifth aspect of this invention, there is provided a communication system, wherein the detection means detects that selection of each of the channels is started, and the means for controlling output level controls the output level of the channels in which start of selection is detected during time period when the channel is selected.

According to a sixth aspect of this invention, there is provided a communication system, wherein the transmission level control means controls the transmission level such that the transmission level comes to be larger than the level immediately before detecting the change of condition.

DESCRIPTION OF THE PREFERRED EMBODIMENTS

Figure 1:
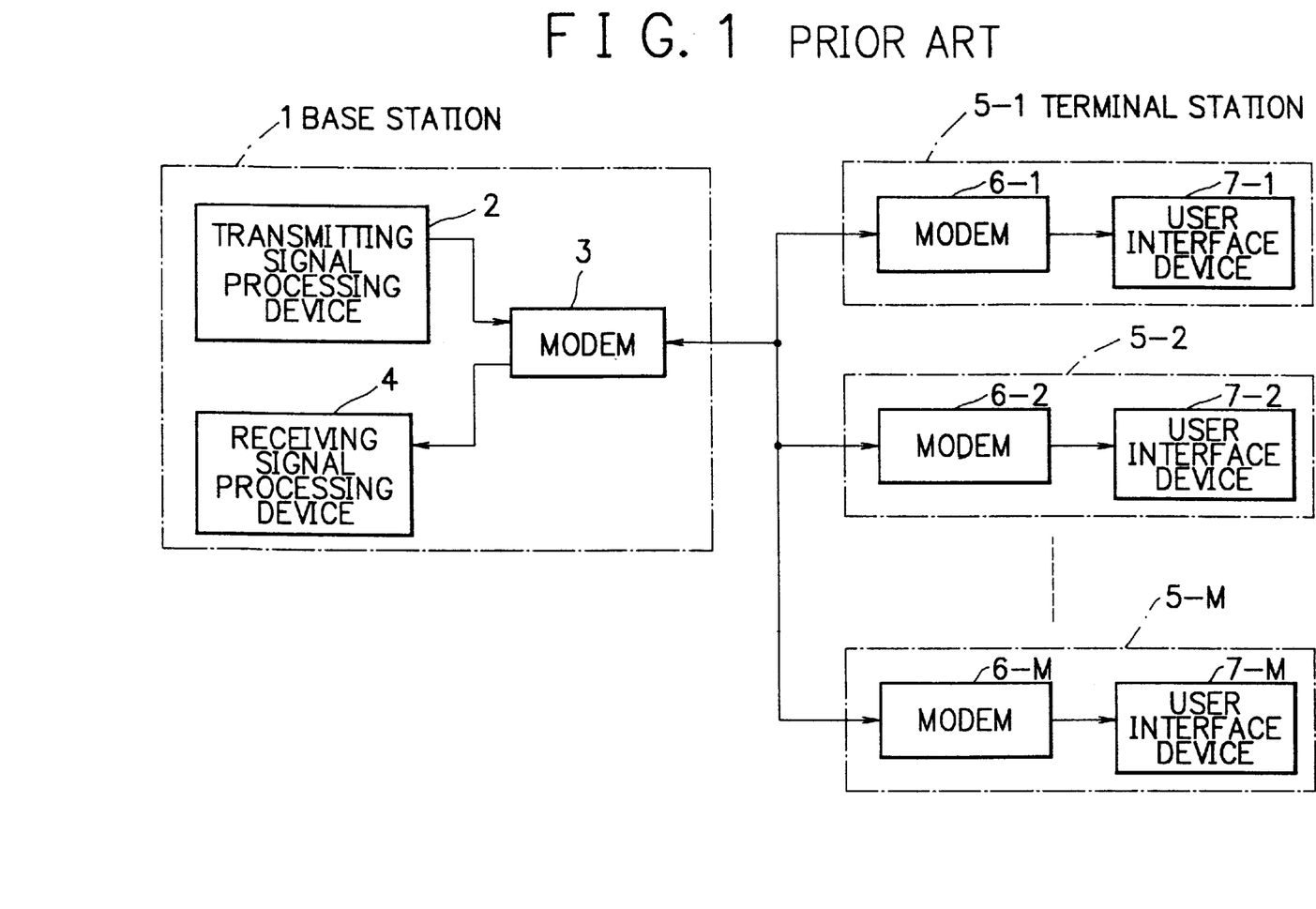
FIG. 1 is a block diagram of a conventional communication system.
Figure 2:
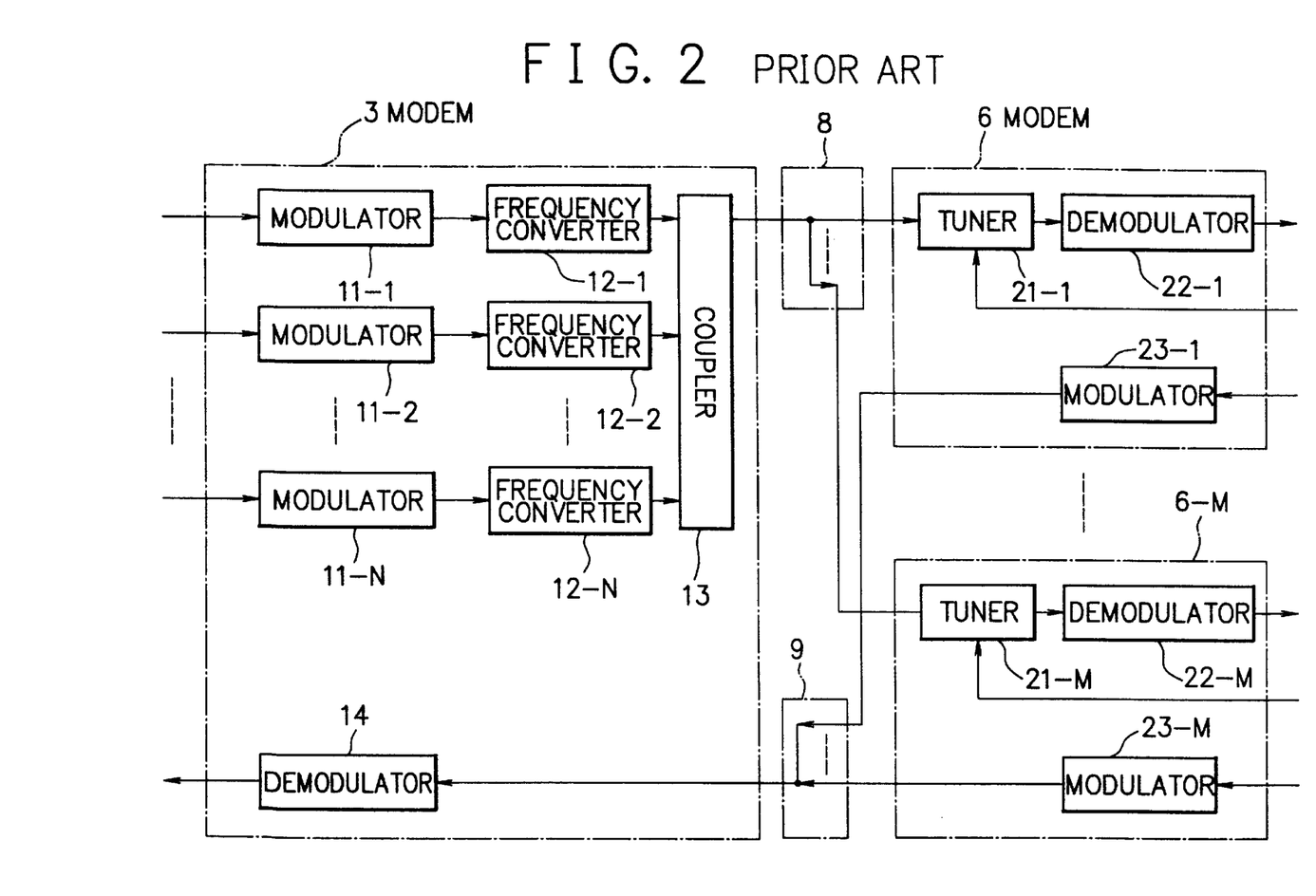
FIG. 2 is a block diagram of modulator and demodulators of the conventional communication system illustrated in FIG. 1.
Figure 3:
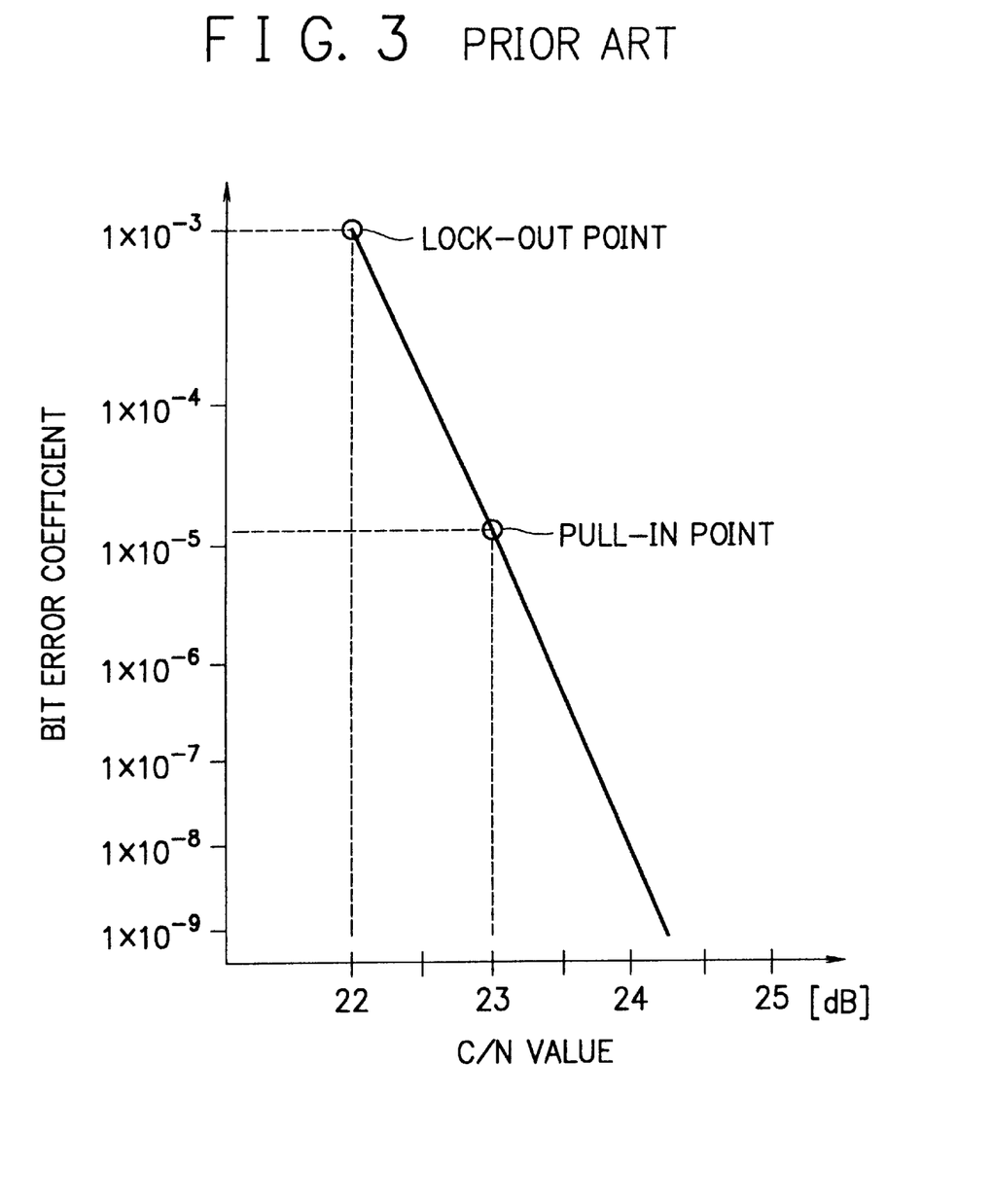
FIG. 3 is a view for use in describing an operation of the conventional communication system illustrated in FIG. 1.

Referring to FIGS. 1, 2, and 3, a conventional communication system will first be described for a better understanding of this invention.

In FIG. 1, the conventional communication system comprises a base station 1 and first through M-th terminal stations 5-1 to 5-M, where M represents an integer greater than two. The base station 1 and first through M-th terminal stations 5-1 to 5-M communicate two ways. The base station 1 comprises a transmitting signal processing device 2, a modulator and demodulator (MODEM) 3, and a receiving signal processing device 4. The modulator and demodulator 3 is connected to the transmitting signal processing device 2 and to the receiving signal processing device 4. The first through M-th terminal stations 5-1 to 5-M transmit channel selection signals to the base station 1, respectively. Each of the channel selection signals is for selecting one of channels.

The transmitting signal processing device 2 processes datum source signals by digital signal and distributes datum source signals to each of the channels to produce channel datum signals which correspond to the channels. The channel datum signals are baseband signals. The transmitting signal processing device 2 supplies the channel datum signals to the modulator and demodulator 3. The datum source signals are signals such as a television signal and a video signal. When the channel datum signals are transmitted to the first through M-th terminal stations 5-1 to 5-M, the receiving signal processing device 4 collects the channel selection signals in the channel datum signals to execute data process such as accounting process. The modulator and demodulator 3 modulates the channel datum signals from the transmitting signal processing device 2 to produce modulated channel datum signals which are intermediate frequency signals. The modulator and demodulator 3 transmits the modulated channel datum signals to the first through M-th terminal stations 5-1 to 5-M. Also, the modulator and demodulator 3 demodulates modulated control datum signals having the channel selection signals from the first through M-th terminal stations 5-1 to 5-M to produce demodulated signals which are baseband signals. The modulator and demodulator 3 supplies the demodulated signals to the receiving signal processing device 4.

The first through M-th terminal stations 5-1 to 5-M comprises first through M-th modulator and demodulators 6-1 to 6-M and first through M-th user interface devices 7-1 to 7-M connected to the first through M-th modulator and demodulators 6-1 to 6-M, respectively. The first through M-th modulator and demodulators 6-1 to 6-M are supplied with the modulated channel datum signals from the modulator and demodulator 3. The first through M-th modulator and demodulators 6-1 to 6-M demodulate the modulated channel datum signals to produce demodulated channel datum signals which are baseband signals. The first through M-th modulator and demodulators 6-1 to 6-M supply the demodulated channel datum signals to the first through M-th user interface devices 7-1 to 7-M, respectively. Also, the first through M-th modulator and demodulators 6-1 to 6-M modulate control datum signals from the first through M-th user interface devices 7-1 to 7-M to produce modulated control datum signals which include the channel selection signals. The first through M-th modulator and demodulators 6-1 to 6-M transmit the modulated control datum signals to the modulator and demodulator 3 of the base station 1. The first through M-th user interface devices 7-1 to 7-M convert the demodulated channel datum signals to produce the television signals. Also, the first through M-th user interface devices 7-1 to 7-M integrate user datum signals having the channel selection signals to produce integrated user datum signals. The first through M-th user interface devices 7-1 to 7-M convert the integrated user datum signals to produce the control datum signals. The first through M-th user interface devices 7-1 to 7-M supply the control datum signals to the first through M-th modulator and demodulators 6-1 to 6-M.

In FIG. 2, the modulator and demodulator 3 of the base station 1 comprises first through N-th modulators 11-1 to 11-N, first through N-th frequency converters 12-1 to 12-N connected to the first through N-th modulators 11-1 to 11-N, a coupler 13 connected to the first through N-th frequency converters 12-1 to 12-N, a down link 8 connected to the coupler 13, and a demodulator 14, where N represents an integer greater than two. The down link 8 is implemented by a coaxial cable or an optical cable.

The first through N-th modulators 11-1 to 11-N of the base station 1 are supplied with the channel datum signals which are baseband signals from the transmitting signal processing device 2. The channel datum signals are different. The first through N-th modulators 11-1 to 11-N modulate the channel datum signals to produce modulated channel datum signals which are the intermediate frequency signals. Ordinarily, one of baseband signals includes one or more of television signals. Also, as the intermediate frequency signal, multi-level digital modulation signal such as 64 QMA modulation signal is used in due consideration of efficiency of use of frequency. In order to multiplex frequencies of the modulated channel datum signals, the first through N-th frequency converters 12-1 to 12-N convert the modulated channel datum signals from the first through N-th modulators 11-1 to 11-N to produce frequency conversion channel datum signals which have different frequencies, respectively. A band of frequencies defines a channel. The coupler 13 multiplexes frequencies of the frequency conversion channel datum signals to produce multiplexed frequency conversion channel datum signals. The coupler 13 transmits the multiplexed frequency conversion channel datum signals, as transmitting signals, through the down link 8 to the first through M-th terminal stations 5-1 to 5-M.

The first through M-th modulator and demodulators 6-1 to 6-M of the first through M-th terminal stations 5-1 to 5-M comprises first through M-th tuners 21-1 to 21-M, first through M-th demodulators 22-1 to 22-M connected to the first through M-th tuners 21-1 to 21-M, first through M-th modulators 23-1 to 23-M, and an up link 9 connected to the first through M-th modulators 23-1 to 23-M. The up link 9 is implemented by a coaxial cable or an optical cable.

The first through M-th tuners 21-1 to 21-M are supplied with the multiplexed frequency conversion channel datum signals from the coupler 13. Each of first through M-th tuners 21-1 to 21-M selects one channel (one carrier) of the multiplexed frequency conversion channel datum signals that is indicated by an outside. Also, each of first through M-th tuners 21-1 to 21-M converts the one channel of converted channel datum signals which are intermediate frequency signal. Each of the first through M-th tuners 21-1 to 21-M is supplied with the channel selection signal, as data for selecting the one of the channels, from each of the first through M-th user interface devices 7-1 to 7-M. Each of the first through M-th demodulators 22-1 to 22-M is supplied with the one channel of the multiplexed frequency conversion channel datum signals from each of the first through M-th tuners 21-1 to 21-M. Each of the first through M-th demodulators 22-1 to 22-M demodulates the one channel of the multiplexed frequency conversion channel datum signals to produce a demodulated channel datum signal which is a baseband signal. Each of the first through M-th demodulators 22-1 to 22-M supplies the demodulated channel datum signal to each of the first through M-th user interface devices 7-1 to 7-M. Also, the first through M-th user interface devices 7-1 to 7-M integrate user datum signals having the channel selection signals and user ID signals to produce integrated user datum signals. The first through M-th user interface devices 7-1 to 7-M convert the integrated user datum signals to produce the control datum signals which are baseband signals. The first through M-th user interface devices 7-1 to 7-M supply the control datum signals to the first through M-th modulators 23-1 to 23-M. The first through M-th modulators 23-1 to 23-M modulate the control datum signals to produce modulated control datum signals which have the channel selection signals. As the modulated control datum signals, digital modulation signals such as QPSK modulation signals are used. The first through M-th modulators 23-1 to 23-M transmit the modulated control datum signals, as transmitting signals, to the demodulator 14 of the base station 1 through the up link 9. The demodulator 14 of the base station 1 is supplied with the modulated control datum signals. The demodulator 14 of the base station 1 demodulates the modulated control datum signals to produce demodulated control datum signals which are baseband signals. The demodulator 14 supplies the demodulated control datum signals to the receiving signal processing device 4.

In the conventional communication system, multi-level QMA modulation signals are used. The demodulator which uses the multi-level QMA modulation signal comprises synchronous detection system which has a PLL circuit that reproduces a carrier from a receiving signal. Generally, the demodulator has the following noise characteristic.

A lock-out point and a pull-in point are different. The lock-out point is defined as a point at which a reproduction carrier becomes asynchronous when a noise gradually increases from a state of no noise. The pull-in point is defined as a point at which a reproduction carrier becomes synchronous when a noise gradually decreases from a state that the reproduction carrier is asynchronous because the noise is greater. Namely, carrier noise ratio (C/N value) of the pull-in point that is required is higher than that of the lock-out point. The carrier noise ratio (C/N value) has hysteresis. In case that the demodulator further have an error correction facility and a waveform equalization facility, the hysteresis becomes greater.

FIG. 3 shows (C/N) error characteristic of 64 QAM modulation signal. As shown in FIG. 3, C/N value of the lock-out point is 22 dB and C/N value of the pull-in point is 23 dB. Therefore, the C/N value has hysteresis of 1 dB. Namely, in case that the carrier is synchronous, it is held that the carrier is synchronous until C/N value becomes 22 dB even when C/N value becomes lower. However, after it is not held that the carrier is synchronous, the carrier does not become synchronous until C/N value becomes 23 dB.

Therefore, in case of designing the communication system, it is needed to be in due consideration of C/N value of the pull-in point and it is not needed to be in due consideration of C/N value of the lock-out point. Namely, C/N value of the pull-in point which is required is satisfied in the whole communication system. Therefore, higher level diagram and noise characteristic are required in the whole communication system.

Figure 4:
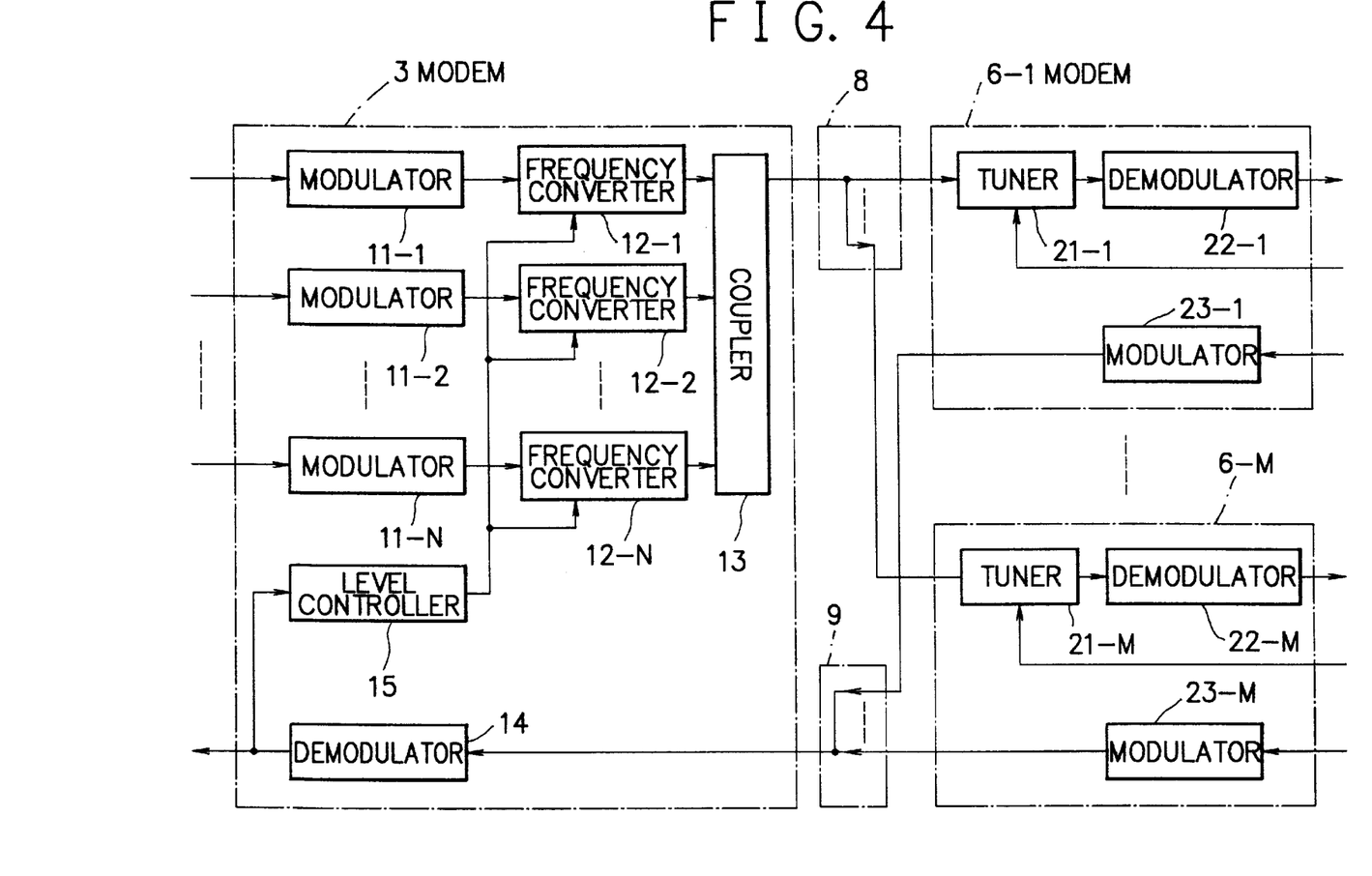
FIG. 4 is a block diagram of modulator and demodulators of a communication system according to a first embodiment of this invention.
Figure 5:
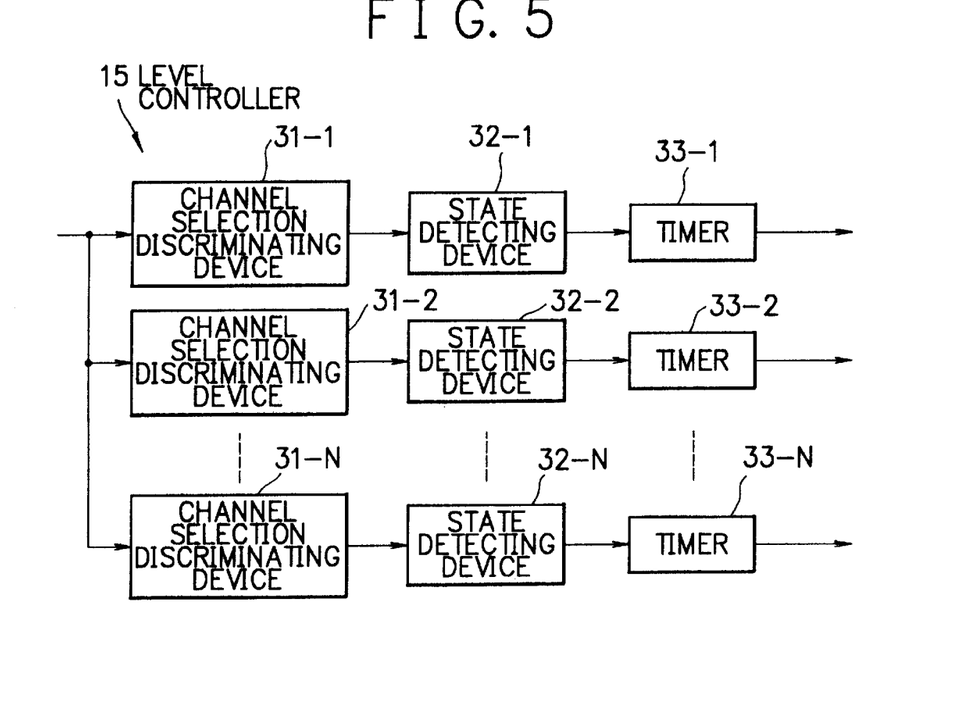
FIG. 5 is a block diagram of a level controller of the communication system illustrated in FIG. 4.

Referring to FIGS. 4 and 5, the description will proceed to a communication system according to a first embodiment of this invention. Similar parts are designated by like reference numerals. The communication system comprises the base station 1 and the first through M-th terminal stations 5-1 to 5-M. The base station 1 comprises the transmitting signal processing device 2, the modulator and demodulator 3, and the receiving signal processing device 4. The first through M-th terminal stations 5-1 to 5-M comprise the first through M-th modulator and demodulators 6-1 to 6-M and the first through M-th user interface devices 7-1 to 7-M.

In FIG. 4, the modulator and demodulator 3 of the base station 1 further comprises a level controller 15. Namely, the modulator and demodulator 3 of the base station 1 comprises the first through N-th modulators 11-1 to 11-N, the first through N-th frequency converters 12-1 to 12-N, the coupler 13, the demodulator 14, and the level controller 15. The level controller 15 is connected to the demodulator 14 and to the first through N-th frequency converters 12-1 to 12-N.

The first through M-th modulator and demodulators 6-1 to 6-M of the first through M-th terminal stations 5-1 to 5-M comprise the first through M-th tuners 21-1 to 21-M, the first through M-th demodulators 22-1 to 22-M, and the first through M-th modulators 23-1 to 23-M.

The level controller 15 is supplied with the channel selection signals of the control datum signals from the demodulator 14. The level controller 15 produces a level control signal to supply the level control signal to the first through N-th frequency converters 12-1 to 12-N. The first through N-th frequency converters 12-1 to 12-N have outside control terminals which are connected to the level controller 15, respectively. The first through N-th frequency converters 12-1 to 12-N are supplied with the level control signal from the level controller 15. The first through N-th frequency converters 12-1 to 12-N control, in response to the level control signal, levels of the multiplexed frequency conversion channel datum signals, respectively.

In FIG. 5, the level controller 15 comprises first through N-th channel selection discriminating devices 31-1 to 31-N, first through N-th state detecting devices 32-1 to 32-N, and first through N-th timers 33-1 to 33-N. The first through N-th-channel selection discriminating devices 31-1 to 31-N are connected to the level controller 15 through the outside control terminals. The first through N-th state detecting devices 32-1 to 32-N are connected to the first through N-th channel selection discriminating devices 31-1 to 31-N, respectively. The first through N-th timers 33-1 to 33-N are connected to the first through N-th state detecting devices 32-1 to 32-N, respectively. Also, the first through N-th timers 33-1 to 33-N are connected to the coupler 13 through the first through N-th frequency converters 12-1 to 12-N, respectively. The level controller 15 is used in the communication system in which almost all the channel datum signals, continually and at the same time, are used in each of the first through M-th terminal stations 5-1 to 5-M. The level controller 15 continually monitors the channel selection signals from the demodulator 14 which is supplied with the control datum signals from the first through M-th terminal stations 5-1 to 5-M. The level controller 15 makes the first through N-th frequency converters 12-1 to 12-N increase, in a predetermined time period, a level of one of the frequency conversion channel datum signals only when number of one of the channels that corresponds to the one of the frequency conversion channel datum signals is increased.

Thereby, it is possible to improve C/N until the carrier becomes synchronous in the carrier which corresponds to one of the channels that is selected after selection of the one of the channels. Therefore, it is possible to extrapolate pull-in characteristic which has hysteresis.

The predetermined time period for controlling the one of levels of the frequency conversion channel datum signals is a time period in which the demodulators 22-1 to 22-M of the terminal stations 5-1 to 5-M normally reach to the pull-in point after selection of the one of the channels. For example, the predetermined time period for controlling is about 1 second. When the predetermined time period for controlling becomes longer, coefficient of time period in which signals of the channels are continually used for controlling levels of the signals becomes greater. It may well be that a level diagram in the whole communication system will be exchanged. The level diagram represents levels of signals in the whole communication system. Also, when the predetermined time period for controlling becomes shorter, the level of the signal is decreased before the demodulators 22-1 to 22-M of the terminal stations 5-1 to 5-M normally reach to the pull-in point after selection of the one of the channels.

As a level value for controlling, a level value which extrapolate hysteresis of pull-in characteristic and lock-out characteristic are appropriate. For example, in case that the demodulators 22-1 to 22-M have the C/N error characteristic as shown in FIG. 3, the level value for controlling is about 1 dB.

The first through N-th channel selection discriminating devices 31-1 to 31-N continually monitor the channel selection signals from the demodulator 14 which is supplied with the modulated control datum signals from the modulators 23-1 to 23-M of the first through M-th terminal stations 5-1 to 5-M. The first through N-th channel selection discriminating devices 31-1 to 31-N discriminate, in response to the channel selection signals, number of each of the channels that is selected by the first through M-th terminal stations 5-1 to 5-M. The first through N-th channel selection discriminating devices 31-1 to 31-N produce channel selection number signals each of which representing the number of each of the channels that is selected by the first through M-th terminal stations 5-1 to 5-M. The first through N-th state detecting devices 32-1 to 32-N are supplied with the channel selection number signals from the first through N-th channel selection discriminating devices 31-1 to 31-N, respectively. The first through N-th state detecting devices 32-1 to 32-N detect changes of states of each of the channel selection number signals. Namely, each of the first through N-th state detecting devices 32-1 to 32-N detects increase of number of each of the channels that is selected by the first through M-th terminal stations 5-1 to 5-M. When each of the first through N-th state detecting devices 32-1 to 32-N detects increase of number of each of the channels that is selected by the first through M-th terminal stations 5-1 to 5-M, each of the first through N-th state detecting devices 32-1 to 32-N produces and supplies channel number increase signal to each of the first through N-th timers 33-1 to 33-N. When each of the first through N-th timers 33-1 to 33-N is supplied with each of the channel number increase signals from each of the first through N-th state detecting devices 32-1 to 32-N, each of the first through N-th timers 33-1 to 33-N produces and supplies, in the predetermined time period, level increase signal, as the level control signal, to one of the first through N-th frequency converters 12-1 to 12-N that corresponds to the channel which is selected by the first through M-th terminal stations 5-1 to 5-M. When each of the first through N-th frequency converters 12-1 to 12-N is supplied with the level increase signal from the one of the the first through N-th state detecting devices 32-1 to 32-N, each of the first through N-th frequency converters 12-1 to 12-N increases level of one of the frequency conversion channel datum signals.

According to the communication system of the first embodiment of this invention, it is possible to improve the pull-in characteristic of multi-value QAM signal without change of level diagram of the whole communication system. This is because the communication system of the first embodiment of this invention increases level of transmitting signal as regards only a carrier which corresponds to a channel which is selected by the terminal stations.

Figure 6:
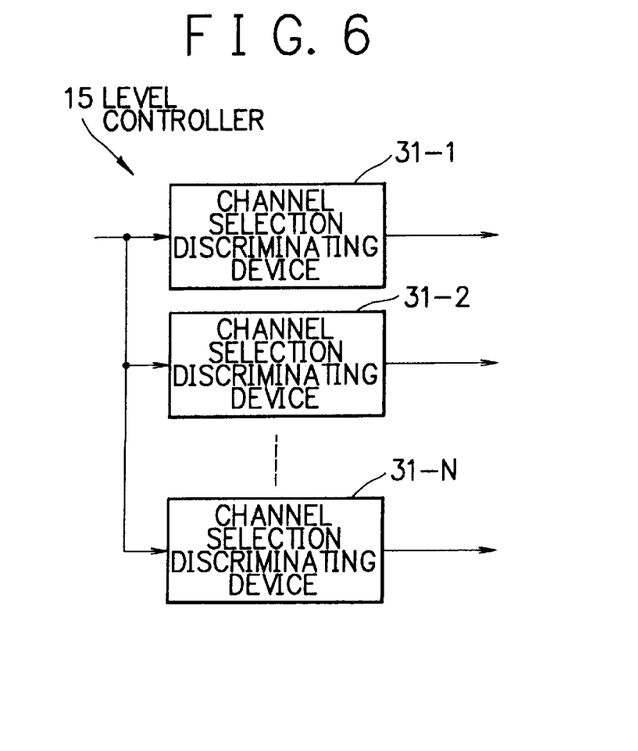
FIG. 6 is a block diagram of a level controller of a communication system according to a second embodiment of this invention.

Referring to FIG. 6, the description will proceed to a communication system according to a second embodiment of this invention. Similar parts are designated by like reference numerals.

FIG. 6 shows a second embodiment of the level controller 15. The level controller 15 is used in the communication system in which almost all the channel datum signals, continually and at the same time, are not used in each of the first through M-th terminal stations. In this event, since number of the channels which, at the same time, are selected by the terminal stations is limited, there are channels being used and not used in certain period of time.

Therefore, when transmitting levels of carriers of the channels which are used are increased and when transmitting levels of other carriers are decreased, it is possible to improve C/N value of the only channels which are used without change of level diagram of the whole communication system.

In FIG. 6, the level controller 15 comprises the first through N-th channel selection discriminating devices 31-1 to 31-N which correspond to the channels. The first through N-th channel selection discriminating devices 31-1 to 31-N are connected to the demodulator 14 and to the first through N-th frequency converters 12-1 to 12-N (FIG. 4). The first through N-th channel selection discriminating devices 31-1 to 31-N are supplied with the channel selection signals from the demodulator 14. The first through N-th channel selection discriminating devices 31-1 to 31-N monitor the channel selection signals. Each of the first through N-th channel selection discriminating devices 31-1 to 31-N detects, in response to the channel selection signals, one of the channels that is presently used and that corresponds to each of the first through N-th channel selection discriminating devices 31-1 to 31-N. When each of the first through N-th channel selection discriminating devices 31-1 to 31-N detects, in response to the the channel selection signals, one of the channels that is presently used, each of the first through N-th channel selection discriminating devices 31-1 to 31-N produces and supplies the level increase signal, as the level control signal, to one of the first through N-th frequency converters 12-1 to 12-N which corresponds to the one of the channels that is presently used. When the one of the first through N-th frequency converters 12-1 to 12-N is supplied with the level increase signal, the one of the first through N-th frequency converters 12-1 to 12-N increases one of the multiplexed frequency conversion channel datum signals that corresponds to the one of the channels that is presently used.

According to the communication system of the second embodiment of this invention, it is possible to improve noise characteristic of carriers which are used without change of level diagram of the whole communication system.

What is claimed is:

1. A communication system in which two-way communications are implemented between a base station and a plurality of terminal stations in such a way that said plurality of terminal stations transmit channel selection signals each of which selects one of channels, so said base station reciprocally, said base station comprising:

a transmitting means for modulating data of a plurality of channels respectively to convert them into frequency corresponding to respective channels, and transmitting said frequency; and a transmission level control means for detecting changes in selection condition of said channels on the basis of channel selection information transmitted from each of said terminal stations denoting a selected channel, and raising for a predetermined period of time a transmission level of only the one of said channels in which a condition change is detected.

2. A communication system as claimed in claim 1, wherein said transmitting means further comprises:

a plurality of modulators which are provided corresponding to said channels, for modulating data of corresponding channels;

a plurality of frequency converters which are provided corresponding to said plurality of modulators, for converting output of corresponding modulators into frequency corresponding to said channels; and a multiplexor which implements frequency multiplexing to each output of said plurality of frequency converters to transmit, wherein said transmission level control means controls respective output levels of said plurality of frequency converters, thus raising the output levels.

3. A communication system as claimed in claim 2, wherein said transmission level control means further comprises:

a detection means for detecting each change of condition of selection information of said channel; and a means for raising output level of said plurality of frequency converters corresponding to said channels whose change of condition is detected.

4. A communication system as claimed in claim 3, wherein said detection means detects change of the number of said channels which is selected respectively, and means for raising output level implements control of output level of said channels during fixed time period from the time when said number is changed, thus raising the output level.

5. A communication system as claimed in claim 4, wherein said detection means detects that selection of each of said channels is started, and said means for raising output level controls said output level of said channels in which start of selection is detected during time period when said channel is selected, thus raising the output level.

6. A communication system in which two-way communications are implemented between a base station and a plurality of terminal stations in such a way that said plurality of terminal stations transmit channel selection signals each of which selects one of channels, to said base station reciprocally, said base station comprising:

a transmitting means which modulates data of a plurality of channels respectively to convert them into frequency corresponding to respective channels, thus transmitting said frequency; and a transmission level control means for controlling each transmission level of said channel in answer to a channel selection information denoting a selection channel while detecting said channel selection information which is transmitted from each of said terminal stations;

said transmitting means comprising, a plurality of modulators which are provided corresponding to said channels, for modulating data of corresponding channels, a plurality of frequency converters which are provided corresponding to said plurality of modulators, for converting output of corresponding modulators into frequency corresponding to said channels, and a multiplexor which implements frequency multiplexing to each output of said plurality of frequency converters to transmit, wherein said transmission level control means controls respective output levels of said plurality of frequency converters.

7. A communication system as claimed in claim 6, wherein said transmission level control means further comprises:

a detection means for detecting each change of condition of selection information of said channel; and a means for controlling output level of said plurality of frequency converters corresponding to said channels whose change of condition is detected.

8. A communication system as claimed in claim 6, wherein said detection means detects change of the number of said channels which is selected respectively, and means for controlling output level implements control of output level of said channels during fixed time period from the time when said number is changed.

9. A communication system as claimed in claim 6, wherein said detection means detects that selection of each of said channels is started, and said means for controlling output level controls said output level of said channels in which start of selection is detected during time period when said channel is selected.

10. A communication system as claimed in claim 6, wherein said transmission level control means controls said transmission level such that said transmission level comes to be larger than the level immediately before detecting said change of condition.

11. In a communication system that includes a base station that communicates both ways with plural terminal stations, where the plural terminal stations each transmit respective channel selection signals to the base station and the base station transmits modulated signals on channels selected by the channel selection signals, the improvement comprising a transmission level controller in the base station for boosting, for a predetermined period of time and responsive to a one of the channel selection signals, a transmission level of only the modulated signal on the channel selected by the one of the channel selection signals.

* * * * *